United States Patent [19]

Cuny

[11] 4,272,104
[45] Jun. 9, 1981

[54] VEHICLE PROVIDED WITH AN INERTIA REEL SEAT BELT

[76] Inventor: Henri E. E. M. Cuny, 14 rue Charles Floquet, 75007 Paris, France

[21] Appl. No.: 887,957

[22] Filed: Mar. 20, 1978

[30] Foreign Application Priority Data

Apr. 25, 1977 [FR] France ............... 77 12396

[51] Int. Cl.³ ........................................... B60R 21/02
[52] U.S. Cl. .............................. 280/801; 280/808
[58] Field of Search ............ 280/744, 747, 745; 297/389, 388

[56] References Cited

U.S. PATENT DOCUMENTS

| | | | |
|---|---|---|---|
| 2,880,788 | 4/1959 | Phillips et al. | 280/747 |
| 2,898,976 | 8/1959 | Barecki | 280/747 |
| 3,754,775 | 8/1973 | Williams | 280/747 |
| 4,070,039 | 1/1978 | Hoffmann | 280/745 |
| 4,118,053 | 10/1978 | Neveux | 280/747 |

FOREIGN PATENT DOCUMENTS

| | | |
|---|---|---|
| 2065272 | 4/1973 | Fed. Rep. of Germany . |
| 2065271 | 5/1973 | Fed. Rep. of Germany . |
| 1358345 | 3/1964 | France . |

*Primary Examiner*—Robert R. Song
*Attorney, Agent, or Firm*—Poms, Smith, Lande & Rose

[57] ABSTRACT

An inertia-reel seat belt wherein a release mechanism and inertia reel are adjacent the door opening for ease of release by outsiders in the event of an accident. The belt passes from adjacent the door across the occupant's lap through a hook member and returns to adjacent the door. The belt is normally deployed by pulling it across the body into looped engagement with the hook. In an emergency, the belt can be released without access to the hook by means of the release mechanism at the door opening.

10 Claims, 17 Drawing Figures

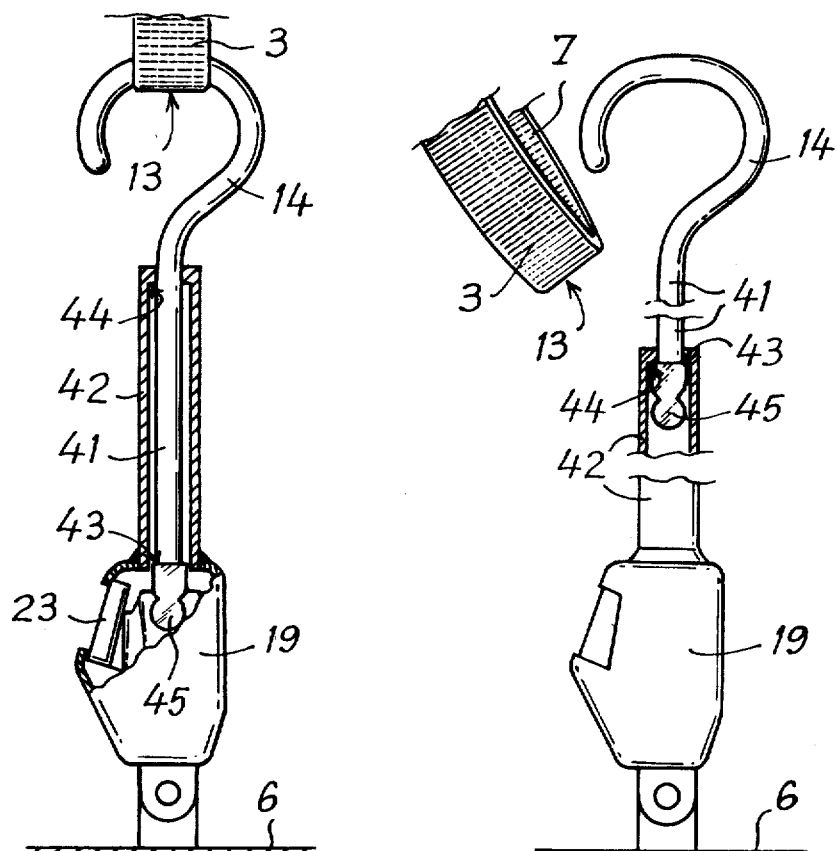
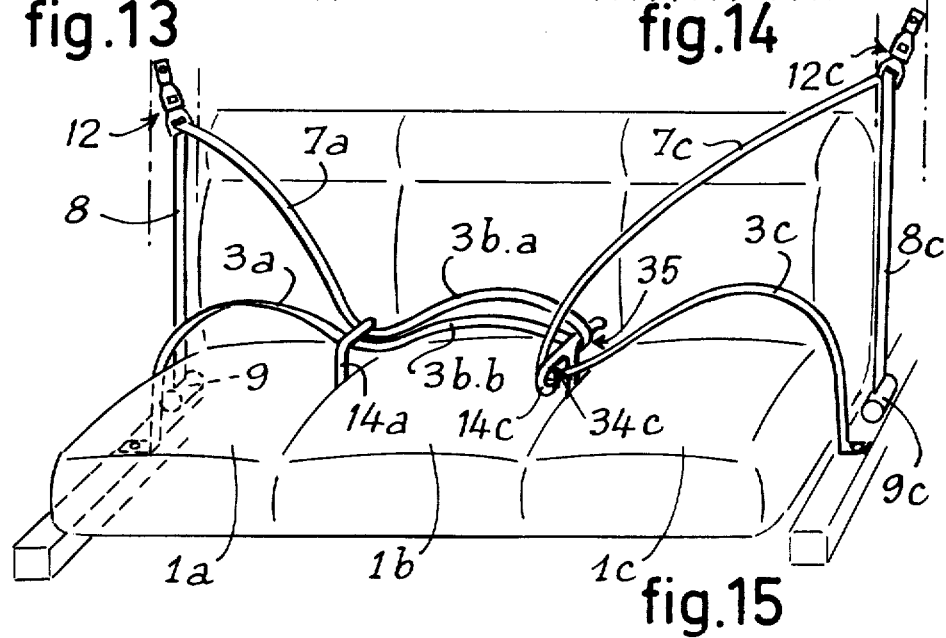

VEHICLE PROVIDED WITH AN INERTIA REEL SEAT BELT

BACKGROUND OF THE INVENTION

The present invention relates to a vehicle provided with an inertia-reel seat belt.

Safety belts with which vehicles are presently equipped are not well adapted to the service expected by the user. In particular, they are awkward to fasten and this is one of the reasons why many motorists do not use them.

The locking system, located between two adjacent seats, is of difficult access, not visible at night and often hidden by part of the clothing. In certain vehicles, the handbrake must be released to be able to reach it. The locking operation is similar to the insertion of a key in a lock, and either one must lean over to see the lock or grope for it, this in either case distracting the driver's attention whilst he is driving.

More serious still are the difficulties in unlocking in the case of an accident. The rescuer arriving from the outside must look for the lock between the two seats and use a torch at night. The two seats may be brought closer together due to the accident and thus wedge the lock, rendering it inaccessible. The body of one of the motorists may be lying on the lock.

Various consequences result from these drawbacks, one being that numerous motorists (more than 20% in France) do not always fasten their seat belt when on the highway, despite the fact that this is compulsory and despite the considerable propaganda which has been made. This reticence, combined with the inconvenience of the frequent lockings and unlockings of the prior known devices, is one reason why the compulsory wearing of seat belts in town has, to the present time, not been enforced.

Statistics clearly show the advantage of the belt, but so many motorists are insensitive to the eloquent figures and adjust their behaviour depending on the few accidents reported by the press.

SUMMARY

It is an object of the present invention to remedy the above-mentioned drawbacks by providing a safety belt comprising a self-locking inertia reel with two distinct systems, one for current use which may be actuated with one hand, even in the dark and whilst moving; the other, a conventional one, but placed so as to be easily reached by a rescuer arriving after an accident, if the self-locking device of the belt remains locked and it is difficult to unhook the belt by the current system of use.

The second device enables the driver and/or the passenger sitting near a door of the vehicle and, possibly, a passenger sitting at the centre of a three- or four-place banquette or rear seat and secured to his seat by one ventral belt, to be disengaged in an emergency.

Thus, the invention relates to a vehicle comprising a structure, at least one seat mounted on this structure and an inertia reel seat belt, and comprising two separate devices for removably fixing said belt on the structure, a first of these fixing devices comprising a hook which is fastened to one of the elements-structure or belt-, and which cooperates with a ring coupled to the other element-belt or structure-, the second fixing device being such that it may be detached even when the portion of the belt which terminates thereon is stretched.

The second fixing device is located on a part of the structure close to the side wall of an interior supported by this structure.

One or more of the following arrangements are, in addition, advantageously adopted:

the second fixing device is located near the lower part of an interior supported by the structure;

the second fixing device is constituted either by the conventional fastening of a belt to the structure, or by the conventional fastening of the two portions of a belt having two separate portions, each having an end fixed to the structure, or by a conventional fastening to the structure of two portions of this belt connected by a permanent join;

the second fixing device removably fixes to the structure the casing of the inertia reel of the belt;

the ring of the first fixing device is constituted by the permanent join of two portions of the belt;

the ring of the first fixing device is separate from the belt;

the hook of the first fixing device is mounted to pivot on the structure about a horizontal transverse axis;

the hook of the first fixing device comprises a rod adapted to slide in a guide and which constitutes with this guide a second fixing device;

apart from the hook of the first fixing device, the vehicle comprises another hook which constitutes an intermediate support for the belt by being disposed between two seats, said belt extending over said two seats;

when, in manner known per se, this vehicle comprises two adjacent seats, each provided with an inertia reel seat belt comprising said first and second fixing devices, the first fixing devices of the two belts comprise a single hook disposed between said two seats;

said single hook comprises either a single branch comprising two bearing zones separated by a shoulder and each corresponding to the support of one of said belts, or two distinct branches which may then be disposed as shown in FIG. 9;

when the vehicle comprises an armrest connected to the structure by means of a connection, said connection and armrest are so shaped that a space is made beneath the armrest which is permanently accessible and in which the hook of the first fixing device is disposed;

when said armrest is central and foldable into a recess in the backs corresponding to the two seats, said space is located at the join of the seats and the backs.

DESCRIPTION OF THE DRAWINGS

The invention will be more readily understood on reading the following description with reference to the accompanying drawings, in which:

FIGS. 13 and 14 show the "first" and "second" fixing devices of a belt according to the invention, in "operating" and "non-use" configuration, respectively.

FIGS. 15 and 16 show different modes of fixing safety belts according to the invention, equipping seats with several places.

DESCRIPTION OF VARIOUS EMBODIMENTS

Figure 1:
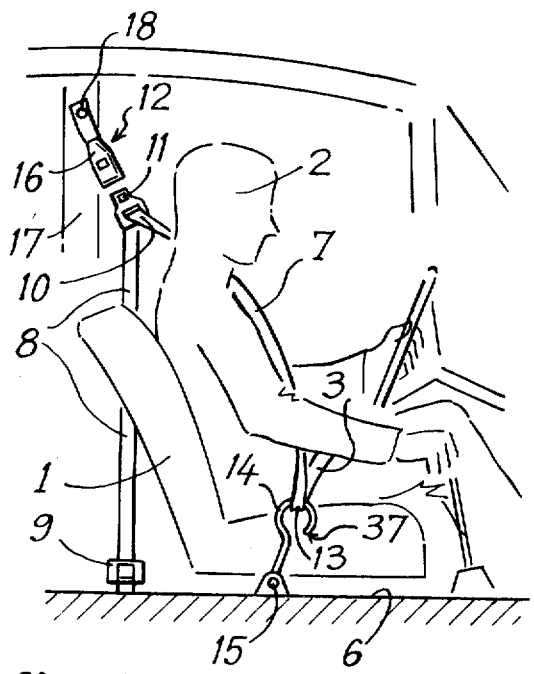
FIG. 1 is a view in elevation of the driver's place in a vehicle according to the invention.
Figure 2:
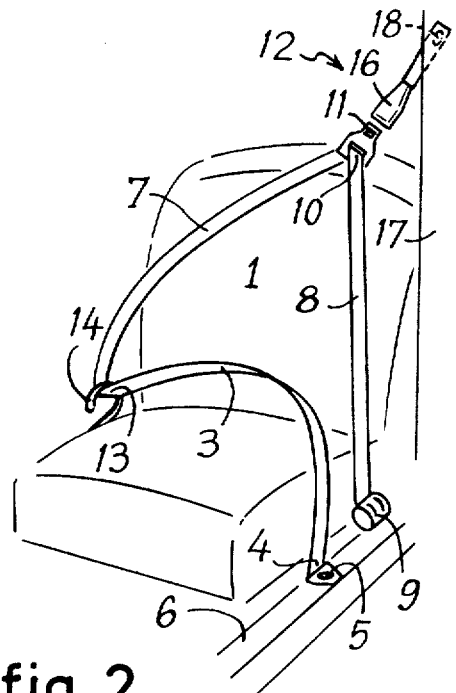
FIG. 2 shows the driver's seat of FIG. 1, the safety belt being in use and on the point of being unhooked.
Figure 3:
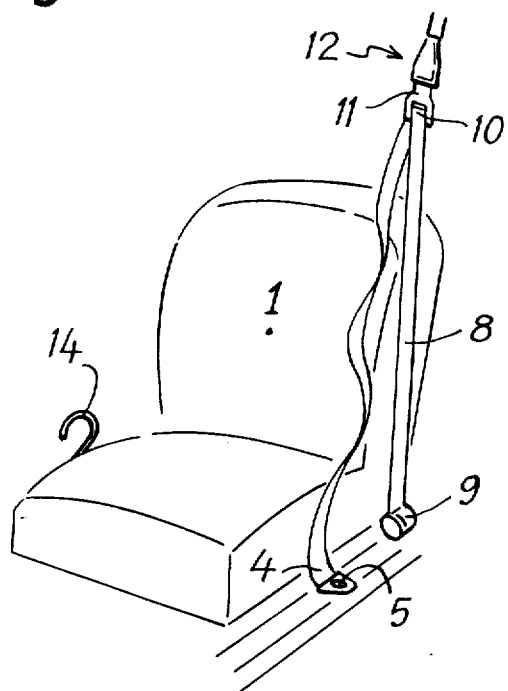
FIG. 3 shows the seat of FIG. 2, whilst the belt is wound up and not in use.

Referring now to the drawings, FIGS. 1 to 3 show that the seat 1 of the driver 2 is provided with an inertia reel safety belt having two active portions: a ventral portion 3, a first end 4 of which is fixed by a screw 5 to the floor 6 of the vehicle, and a diagonal portion 7. This belt also comprises a passive portion 8 which connects the automatic inertia reel 9 to one end of the diagonal portion 7, the join 10 of these two portions abutting on the detachable element 11 of a fixing device 12, hereinafter referred to as second fixing device, and ensuring the continuity of the belt. The other end of the diagonal portion 7 joins the second end of the ventral portion 3 at a join 13 of the two portions, which ensures the reciprocal extension of these portions. This join is supported, when the belt is in use (FIGS. 1 and 2) on a hook 14 pivoted on the floor 6 about a horizontal, transverse axis 15.

Figure 4:
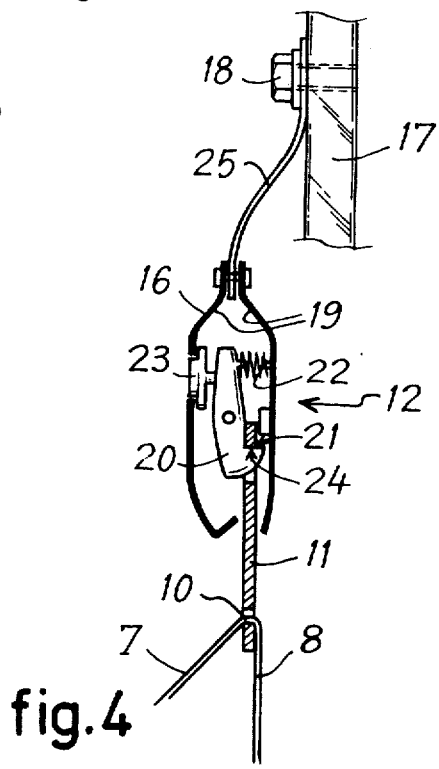
FIG. 4 is a section through the safety fastening of the belt of FIGS. 1 to 3, said fastening referred to as "second fixing device".

It should be noted that the detachable element 11 of the device 12 may be detached from the fixed element 16 of this device which, itself, remains attached to an upright 17 of the body-work located near a door, by a screw 18. This disengagement is possible even when the diagonal portion 7 and passive portion 8 are stretched. To this end, the fixing device 12 may be constituted by a commercially available buckle, as shown in FIG. 4. In this example, the element 16 comprises a casing 19 inside which a rocking lever 20 provided with a fastening catch 21 is connected, on the one hand, to a return spring in fastened position 22, on the other hand to a push element 23 for controlling disengagement. The element 11 is provided with an opening 24 which cooperates with the catch 21 to effect fastening. The casing 19 is attached to the upright 17 of the structure by a flexible connection 25, such as a length of belt.

Figure 5:
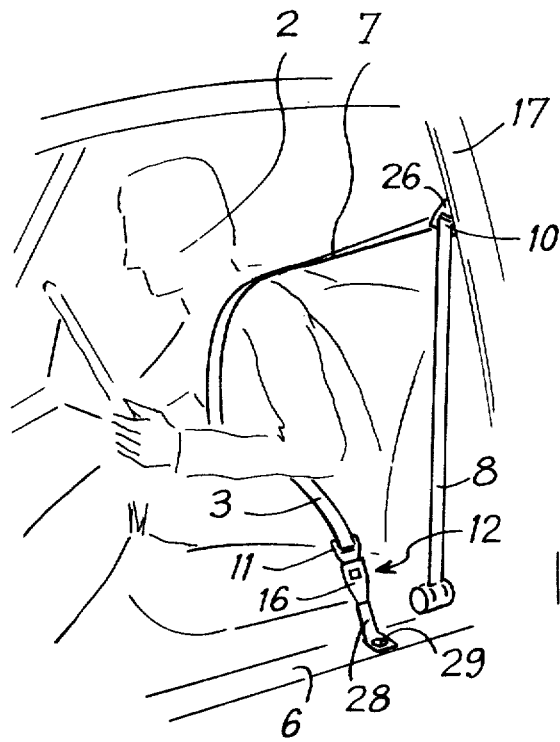
FIG. 5 is a variant embodiment of the belt of FIG. 2.

FIG. 5 shows a slightly different arrangement from that of FIGS. 1 to 3, in which the join of the diagonal portion 7 and passive portion 8 is supported on an element 26 definitively fixed to the upright 17 and not detachable therefrom. However, it is still possible to detach the belt since the fixing device 12 is interposed between an appendage 28 for fixation to the floor 6, fixed on said floor by a screw 29, and the end of the ventral portion 3.

Figure 6:
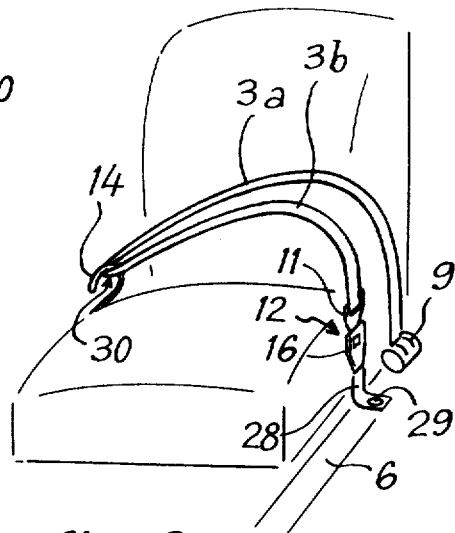
FIG. 6 is another variant embodiment of the belt of FIG. 2.

Similarly, the belt of FIG. 6 comprises only a ventral portion divided into two parts 3a-3b, folded on each other in the zone of their join 30, one of the ends of portion 3a-3b being provided with the detachable element 11 of the device 12, and the other end being wound in the inertia reel 9. The fixed element 16 of the device 12 is attached by the appendage 28 and the screw 29 to the floor 6. The join 30 is in addition supported by the hook 14.

Figure 7:
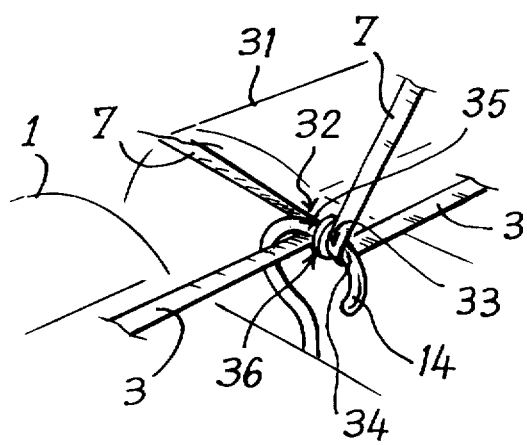
FIGS. 7 to 10 illustrate variant embodiments of the hook of a belt according to the invention, suitable for the belt of a single seat (FIG. 8) or for the separate belts of two adjacent seats (FIGS. 7, 9 and 10).

The vehicle very frequently comprises two separate seats 1 and 31 which are adjacent (FIG. 7). These seats each possess a safety belt, for example of the lap and diagonal type, whilst the respective joins 32, 33 of the diagonal portion 7 and ventral portion 3 of the two belts are supported by the same hook 14. However, to avoid the belts tangling, the hook 14 comprises two bearing zones 34, 35, separated by a shoulder 36.

Figure 8:
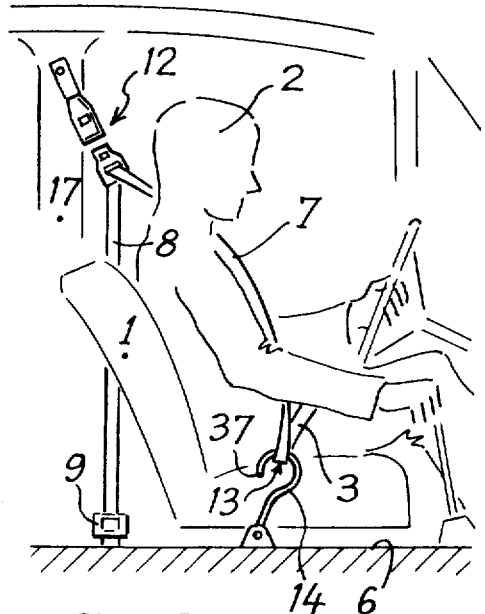

The arrangement of FIG. 8 is very similar to that of FIG. 1. The only difference lies in the arrangement of the hook 14, the point 37 of which, in the case of FIG. 1, faces forwards, whilst this point faces rearwards in the case of FIG. 8.

Figure 9:
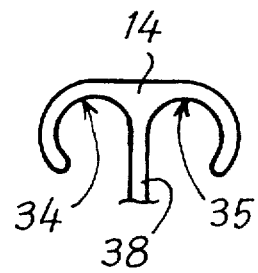
Figure 10:
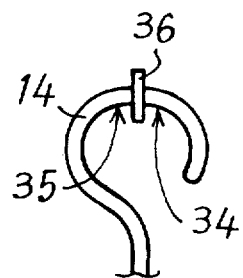
Figure 11:
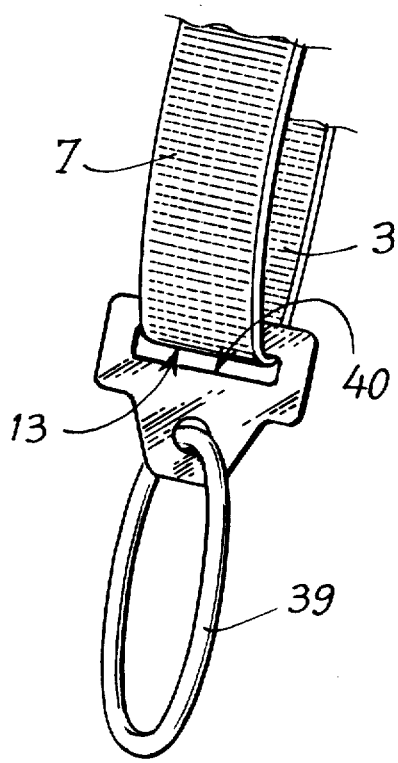
FIG. 11 shows a variant of the ring for hooking on the hook mentionned hereinabove of a belt according to the invention.

It should be noted that, in the case of a hook 14 with two bearing zones, similar to the one used in the vehicle of FIG. 7 and shown in FIG. 10, variant embodiments ensuring the same function of hooking exist. One of these, shown in FIG. 9, is in the form of a T with horizontal bar and provides two bearing zones 34, 35 separated, this time, by the stem 38 of the T.

It will further be noted that the element for hooking the belt on the hook 14 may be constituted by the join 13 of the diagonal portion 7 and the ventral portion 3 (for example, FIG. 1), but may also be constituted by a ring 39 separate from the belt, being attached thereto by a slidable buckle 40 located at join 13.

Figure 12:
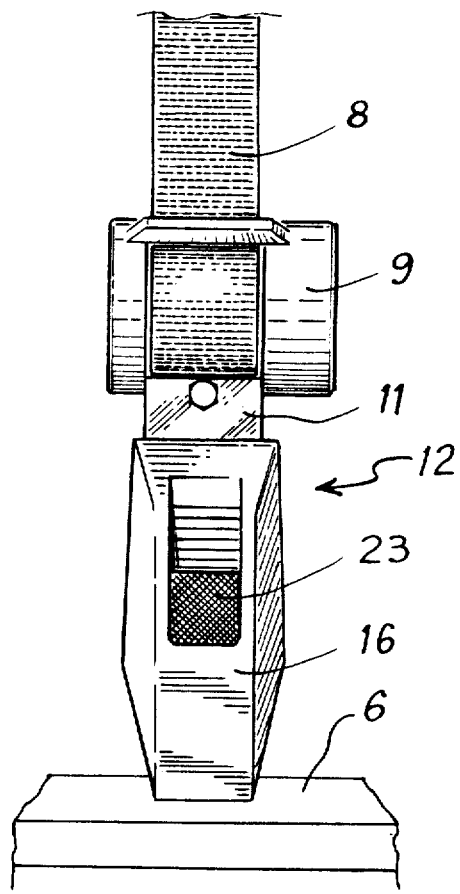
FIG. 12 shows a variant embodiment of the "second fixing device".

The detachable fixing device, whilst the portions of the belt are stretched, may also take the form of the embodiment of FIG. 12, according to which the inertia reel 9 is rendered detachable, the device 12 being interposed between said reel and the floor 6.

According to the embodiment of FIGS. 13 and 14, the hook 14 is mounted at the end of a cylindrical rod 41 which is mounted to slide in a sleeve 42. A shoulder 43 of the rod prevents said rod from leaving the sleeve 42, said shoulder being able, in an extreme position, to abut on a stop 44 fast with the sleeve. This sleeve 42 is fast with the casing 19 provided with the push element 23 for disengagement, whilst the end of the rod 41, beyond the shoulder 43, is provided with the detachable element 45 of a conventional buckle device of a safety belt. The casing 19 is for example fixed to the floor 6. When the rod 41 is driven in the sleeve 42 and is maintained in this position by the element 45 locked in the casing 19, the belt is in abutment on the hook 14 (FIG. 13). On the contrary, when the detachable element 45 is separate from the casing 19 (FIG. 14), the rod 41 may leave the sleeve 42 and thus disengage the portions 7-3 of the belt with respect to the hook 14.

The application of the arrangements which have been described may be made to seats for one person, but also to seats with several places.

Thus, a banquette or rear seat with three places (FIG. 15) may be provided with two hooks 14a and 14c disposed between seats 1a and 1b for one, and 1b and 1c for the other, and with two belts only. One of these belts 8c-7c-3c is in all points identical to the belt shown in FIG. 2. It is hooked on one of the branches 34c of the double hook 14c and corresponds to single seat 1c. The other belt, on the other hand, corresponds to two seats 1a and 1b. It is constituted by the following portions:

passive portion 8 diagonal portion 7a corresponding to seat 1a ventral portions 3ba and 3bb corresponding to seat 1b, similar to portions 3a and 3b of the belt of FIG. 6 ventral portion 3a corresponding to seat 1a.

The ventral portions 3ba and 3bb are hooked on the second branch 35 of the hook 14c, whilst the joins of portions 7a-3ba, and 3bb-3a are supported on hook 14a.

Figure 16:
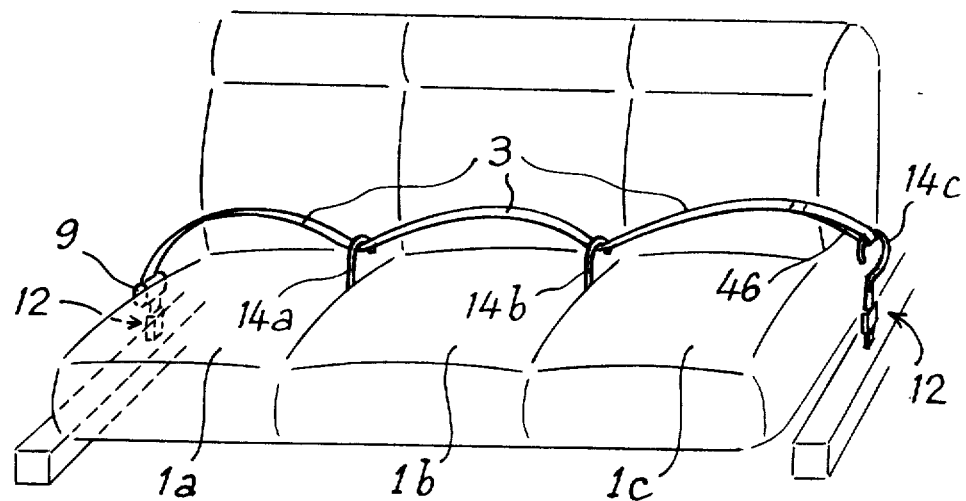

A variant of a single belt suitable for a banquette or rear seat with three seats 1a, 1b, 1c is shown in FIG. 16. Three single hooks 14a, 14b, 14c are disposed as follows: 14a, between seats 1a and 1b; 14b, between seats 1b and 1c; and 14c, beside the seat 1c. One ventral belt 3 only is provided, one end of which is wound in the reel 9, so as to be detachable (12), its other end constituting a loop 46 which is hooked on hook 14c. It should also be noted that this hook 14c is detachable (12). The single ventral portion 3 is supported on hooks 14a and 14b.

The arrangements described with reference to the preceding Figures are also suitable when they are applied to two adjacent seats 1a, 1b between which is provided an armrest 47 foldable in a recess 48. The or each hook 14 is disposed in the lower hollow of the recess 48. The hook 14 shown is permanently accessible, whether the armrest is in use or on the contrary folded in the recess 48 and, in addition, the belt 7-3 may remain hooked on the hook 14 during pivoting of the armrest. To attain this type of functioning, the armrest 47 is mounted to pivot on the structure of the vehicle about an axis 49 by means of a bent element, constituted in the example shown by two bent arms 50. When the armrest 47 is in use, the hook 14 is disposed beneath the arms 50 and is accessible from the side for hooking the belt 7-3 thereof.

The gist of the invention lies in the combination, for the first time, of a satisfactory ease of use and of reliable security, in the same safety belt.

In normal use, the fixing device 12 remains connected to the structure of the vehicle. The user of the belt, without having to effect a precise and long interlocking of the "lock" type, passes his belt in hook 14. The simplicity of this gesture doubtlessly facilitates the effective use of the belt, and even its fastening whilst the vehicle is moving.

In the case of accident, the belt holds the user in position and thus limits the consequences due to shocks. When it is necessary to release the user who remains in position due to the belt, disengagement of the belt from hook 14 is often difficult, if not impossible, since the belt is strongly stretched. On the contrary, it is simple to press on the push element 23 of the device 12, this being effective as it provokes release of the portions of belt and enables the injured person to be removed from the vehicle.

It should be noted that the device 12 is advantageously located near a side wall of the vehicle to be accessible to a rescuer from the outside. Thus, this device 12 is sometimes fixed on the upright 17, between two side doors (FIG. 1), and sometimes on the floor 6 of the vehicle, on the door side (FIGS. 5 and 12). This device is naturally placed where it is most accessible: either at the top of the door upright 17 of a private vehicle (FIG. 1) or near the floor 6 of a larger vehicle, such as a coach (FIGS. 6,12 and 16).

It suffices to combine the ease of fastening on a hook 14, the safety against the shocks of a conventional belt, and the safety against the impossibility of unhooking obtained by adopting the detachable device 12, to produce a reliable and efficient belt. The detachable device 12 may then be located at numerous separate spots and act as member for direct abutment of the belt on the structure (FIG. 1) or as member for indirect abutment and, for example, fix the inertia reel 9 or the hook 14 (FIGS. 13 and 14).

The hooks comprising two bearing zones are advantageous, certain (FIG. 10) being particularly simple and inexpensive to produce.

Furthermore, it is important that the application may be made to several seats or banquettes, particularly by reason of the development of public transport. The arrangements of FIGS. 15 and 16 show examples of such applications.

Figure 17:
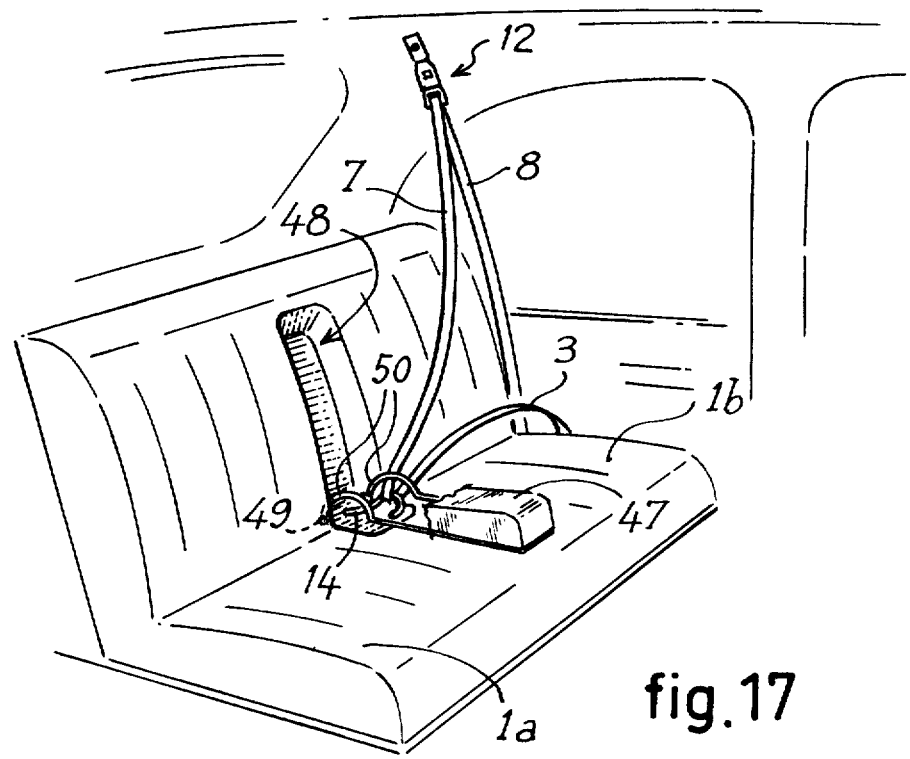
FIG. 17 shows the arrangement of a belt according to the invention, equipping a seat provided with a foldable armrest.

Finally, banquettes with armrests may also be equipped according to the invention (FIG. 17).

What is claimed is:

1. In a vehicle including an internal platform area having a seat mounted on the platform adjacent an entry/exit opening of the vehicle, the improved seat belt system comprising:
   (a) a first belt fastener mounted to the platform on the vehicle opening side of the seat;
   (b) a second belt fastener mounted to the platform on the vehicle opening side of the seat;
   (c) a hook member including a downward facing hook portion mounted to the platform on the side of the seat opposite the vehicle opening; and,
   (d) a seat belt assembly including a seat belt connected on one end to said first belt fastener and connected on the opposite end to said second belt fastener, said seat belt being of sufficient length to pass from said first belt fastener across the seat with an occupant therein, around said hook portion of said hook member, and back across the seat and occupant to said second belt fastener, said seat belt further being of such length that normal deployment and removal of said belt can be accomplished by engaging and disengaging said belt from said hook portion of said hook member, said seat belt assembly further including means disposed adjacent the vehicle opening for releasing the seat belt an amount sufficient to allow the occupant to exit the vehicle through the vehicle opening in an emergency without disengaging said belt from said hook portion of said hook member.

2. The improved seat belt system for a vehicle of claim 1 wherein:
   said seat belt assembly further includes a sliding member mounted on said seat belt for releasably engaging said hook portion of said hook assembly.

3. The improved seat belt system for a vehicle of claim 1 wherein:
   said seat belt assembly further includes inertia locked retraction reel means disposed between said first and second belt fasteners for allowing said seat belt to be extended to easily engage and disengage said hook portion of said hook member and allow freedom of movement for the occupant and for locking said seat belt against extension to restrain the movement of the occupant in an emergency producing an inertia force above a threshold amount.

4. The improved seat belt system for a vehicle of claim 1 wherein said releasing means comprises:
   (a) a sliding member having said seat belt in sliding engagement therewith and including a first portion of a releasable locking member; and,
   (b) a second portion of a releasable locking member disposed adjacent the vehicle opening above the shoulder of an occupant of the seat and adapted to releasably engage said first portion of the releasable locking member whereby when deployed said seat belt forms a ventral portion and a diagonal portion.

5. The improved seat belt system for a vehicle of claim 4 and wherein additionally:
said seat belt assembly further includes inertia locked retraction reel means disposed between said first and second belt fasteners for allowing said seat belt to be extended to easily engage and disengage said hook portion of said hook member and allow freedom of movement for the occupant and for locking said seat belt against extension to restrain the movement of the occupant in an emergency producing an inertia force above a threshold amount.

6. The improved seat belt system for a vehicle of claim 1 wherein:
(a) said hook portion is extensible and retractable in said hook member; and,
(b) said hook member includes releasable latch means for holding said hook portion in a retracted position whereby said hook portion can be extended in an emergency whereby said hook portion can be extended in an emergency to release said seat belt when said seat belt is otherwise under tension sufficient to prevent normal disengagement from said hook portion.

7. The improved seat belt system for a vehicle of claim 1 wherein the seat has positions for two occupants and wherein the invention additionally comprises:
a second hook member including a downward facing hook portion mounted to the platform between the two seating positions and disposed to releasably engage said seat belt and hold said seat belt close adjacent the lap of occupants in the seat when deployed.

8. The improved seat belt system for a vehicle of claim 1 and additionally comprising:
a sliding member having said seat belt in sliding engagement therewith disposed adjacent the vehicle opening above the shoulder of an occupant of the seat whereby when deployed said seat belt forms a ventral portion and a diagonal portion.

9. The improved seat belt system for a vehicle of claim 7 wherein:
said second hook member includes a pair of said downward facing hook portions for engaging two seat belts on separate hooks.

10. The improved seat belt system for a vehicle of claim 7 and further including:
a foldable arm rest disposed between the two seating positions and including a space therein disposed to receive said hook portion and allow access to said hook portion for deployment and removal of said seat belt.

* * * * *